United States Patent
Chu

(10) Patent No.: US 10,224,005 B2
(45) Date of Patent: Mar. 5, 2019

(54) DRIVING DEVICE AND DRIVING METHOD

(71) Applicant: AU Optronics Corporation, Hsin-Chu (TW)

(72) Inventor: Yi-Ming Chu, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 197 days.

(21) Appl. No.: 15/403,509

(22) Filed: Jan. 11, 2017

(65) Prior Publication Data

US 2018/0040298 A1  Feb. 8, 2018

(30) Foreign Application Priority Data

Aug. 4, 2016 (TW) .............................. 105124813 A

(51) Int. Cl.
*G09G 5/12* (2006.01)
*G09G 3/34* (2006.01)
*G06F 3/14* (2006.01)
*G09G 3/20* (2006.01)

(52) U.S. Cl.
CPC ............ *G09G 5/12* (2013.01); *G06F 3/1423* (2013.01); *G09G 3/2096* (2013.01); *G09G 3/3406* (2013.01); *G09G 2310/08* (2013.01); *G09G 2320/0252* (2013.01); *G09G 2320/0626* (2013.01); *G09G 2330/022* (2013.01); *G09G 2360/18* (2013.01); *G09G 2370/10* (2013.01)

(58) Field of Classification Search
CPC ........... G09G 3/3406; H04N 21/41422; H04N 21/4223; H04N 21/42684; H04N 21/4302
See application file for complete search history.

(56) References Cited

U.S. PATENT DOCUMENTS

| 8,362,996 B2 | 1/2013 | Huang et al. |
| 2001/0006525 A1* | 7/2001 | Mizuguchi ......... H04N 21/4108 370/538 |
| 2006/0038810 A1 | 2/2006 | Ebata et al. |

(Continued)

FOREIGN PATENT DOCUMENTS

| TW | 200609899 A | 3/2006 |
| WO | WO2016017144 A1 | 2/2016 |

OTHER PUBLICATIONS

Taiwan Intellectual Property Office, "Office Action", dated Dec. 30, 2016.

*Primary Examiner* — Abbas I Abdulselam
(74) *Attorney, Agent, or Firm* — WPAT, PC

(57) ABSTRACT

A driving device includes a phase detection unit, a signal reconstruction unit, and a plurality of transmission units. The signal reconstruction unit is coupled to the phase detection unit. The phase detection unit is configured to receive a plurality of synchronous signals corresponding to a plurality of data packets, and detect a phase difference between the synchronous signals to generate a detection result signal. The signal reconstruction unit is configured to generate a reconstructed synchronous signal according to the detection result signal. The plurality of transmission units is configured to receive the reconstructed synchronous signal, and synchronize a plurality of pixel data corresponding to the data packets according to the reconstructed synchronous signal for transmission to a plurality of display devices.

13 Claims, 2 Drawing Sheets

(56) References Cited

U.S. PATENT DOCUMENTS

2006/0078072 A1\* 4/2006 Cheon .................. H04L 27/066
  375/326
2011/0157106 A1 6/2011 Kim et al.
2017/0310576 A1\* 10/2017 Berry ..................... H04L 45/22

\* cited by examiner

DRIVING DEVICE AND DRIVING METHOD

BACKGROUND

Technical Field

The present disclosure relates to a driving technology, and more particularly to a driving device and a driving method.

Related Art

In a multi-display display technology (for example, a virtual reality (VR) display technology), synchronization of display data is one of the major considerations. For example, display data may encounter a skew phenomenon because of inconsistent impedance matching or path lengths. Once display data is skewed, asynchronous display may be caused, or even a user may experience discomfort during viewing.

SUMMARY

An aspect of the present disclosure provides a driving device, including a phase detection unit, a signal reconstruction unit, and a plurality of transmission units. The signal reconstruction unit is coupled to the phase detection unit. The phase detection unit is configured to receive a plurality of synchronous signals corresponding to a plurality of data packets, and detect a phase difference between the synchronous signals to generate a detection result signal. The signal reconstruction unit is configured to generate a reconstructed synchronous signal according to the detection result signal. The transmission units are configured to receive the reconstructed synchronous signal, and synchronize a plurality of pixel data corresponding to the data packets according to the reconstructed synchronous signal for transmission to a plurality of display devices.

Another aspect of the present disclosure provides a driving method, including the following steps. A synchronous signal generator generates a reconstructed synchronous signal according to a phase difference between a plurality of synchronous signals. The synchronous signals are obtained by decoding a plurality of data packets. A plurality of transmission units synchronizes a plurality of pixel data according to the reconstructed synchronous signal for transmission to a plurality of display devices. The pixel data is obtained by decoding the data packets.

In conclusion, the driving device according to the present disclosure may effectively synchronize pixel data for synchronous display of display devices to eliminate a skew phenomenon between different data packets. In addition, the driving device may further control a time at which a backlight unit is turned on, to further reduce viewing discomfort of a user.

The foregoing description is described in detail below with reference to the implementation manners, and the technical solutions of the present disclosure are further explained.

BRIEF DESCRIPTION OF THE DRAWINGS

To make the foregoing and other objectives, features, advantages, and embodiments of the present disclosure more comprehensible, the accompanying drawings are described as follows.

DETAILED DESCRIPTION

The following disclosure provides many different embodiments or examples to implement features of the present invention. Digital symbols and/or letters may be repeatedly used in different examples of the present disclosure, and the repetitions are for the purpose of simplicity and description, but do not specify relationships between different embodiments and/or configurations in the following discussions.

In the description and the claims, unless articles are specially defined in the text, "a" and "the" may generally refer to "one or more". It needs to be further understood that "include", "comprise", "have", and similar vocabularies used herein indicate recorded features, areas, integers, steps, operations, elements and/or components, but do not exclude the discussed or additional one or more other features, areas, integers, steps, operations, elements, components, and/or a group thereof.

When it is described that one element is "connected" or "coupled" to another element, the element may be directly connected or coupled to another element, or an additional element is provided the two elements. In contrast, when it is described that an element is "directly connected" or "directly coupled" to another element, no additional element exists.

"About", "approximately" or "basically" used herein generally refer to that an error or a range of a value is within about 20 percent from the value, preferably is within about 10 percent, and further preferably is within 5 percent. Unless otherwise explicitly indicated, a mentioned value is seen as an approximate value, that is, within an error or range represent by "about", "approximately" or "basically".

Figure 1:
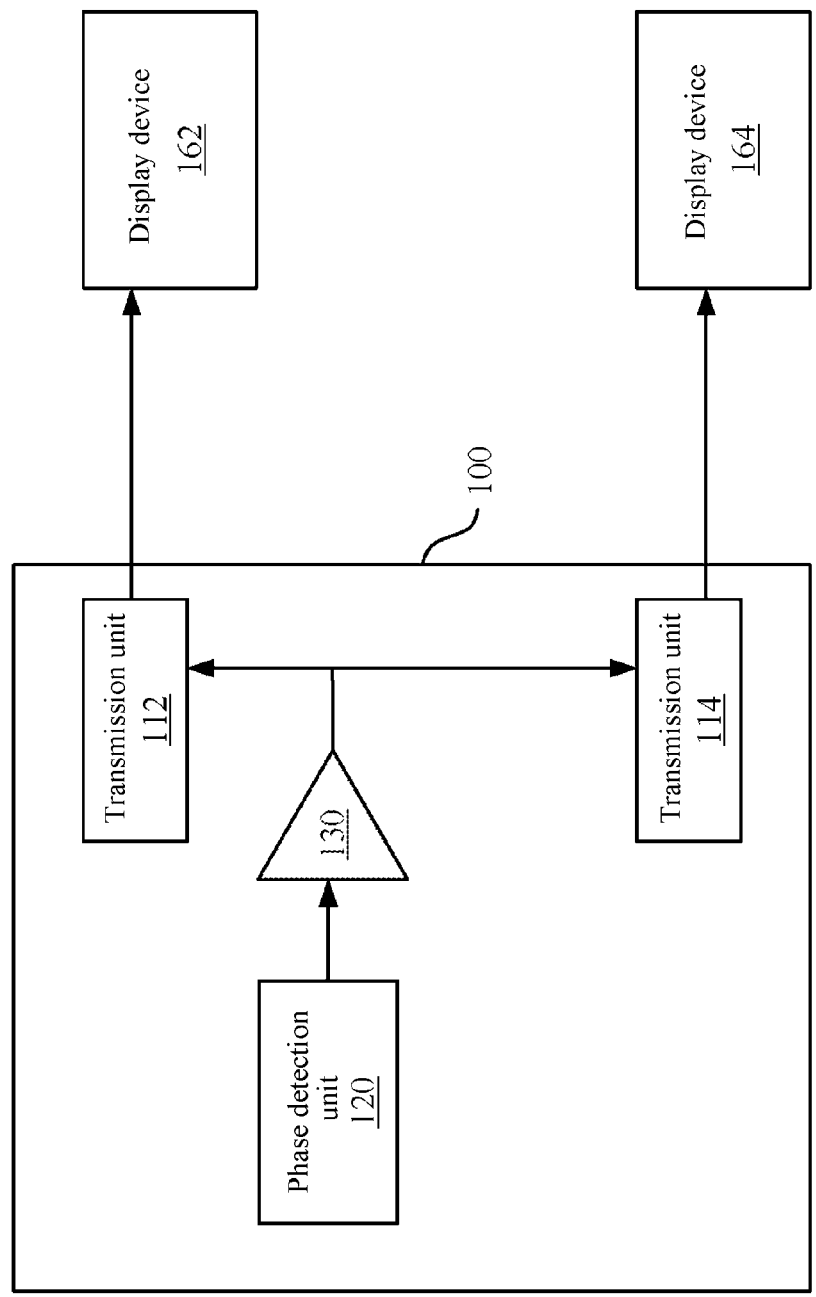
FIG. 1 is a schematic diagram of a driving device according to an embodiment of the present disclosure.

FIG. 1 is a schematic diagram of a driving device 100 according to an embodiment of the present disclosure. The driving device 100 includes a plurality of transmission units 112, 114, a phase detection unit 120, and a signal reconstruction unit 130. The signal reconstruction unit 130 is coupled to the phase detection unit 120 and the transmission units 112, 114. The transmission units 112, 114 are respectively coupled to display devices 162, 164 (for example, a liquid crystal display, an organic light-emitting diode display (OLED) or a display of another type.

In terms of operations, the phase detection unit 120 is configured to receive a plurality of synchronous signals corresponding to a plurality of data packets, and detect a phase difference between the synchronous signals to generate a detection result signal. Specifically, different data packets (including pixel data and synchronous signals) may encounter an asynchronous phenomenon because of inconsistent impedance matching or path lengths. The phase detection unit 120 may detect a phase difference between synchronous signals of each of the different data packets, and generate the detection result signal according to the phase difference. Next, the signal reconstruction unit 130 (for example, a synchronous signal generator) is configured to generate a reconstructed synchronous signal according to the detection result signal and transmit the reconstructed synchronous signal to the transmission units 112, 114. The transmission units 112, 114 are configured to receive a same reconstructed synchronous signal, and synchronize a plurality of pixel data corresponding to the data packets according to the reconstructed synchronous signal for transmission to the display devices 162, 164 (for example, a display device in a left-eye position and a display device in a right-eye position of a user).

In such a manner, the driving device 100 may generate a same reconstructed synchronous signal according to asynchronous data packets, to further synchronize pixel data of the data packets. Therefore, the display devices 162, 164 may synchronously display the pixel data, so as to eliminate a skew phenomenon between different data packets, thereby greatly reducing discomfort in a viewing process of a user because of asynchronous display of the display devices 162, 164.

To describe a manner in which the phase detection unit 120 generates the detection result signal, in an embodiment, the phase detection unit 120 is further configured to select a synchronous signal whose phase has a longest lag from the synchronous signals as the detection result signal. In other words, the phase detection unit 120 uses a synchronous signal whose phase has a longest lag of synchronous signals of each one of different data packets as the detection result signal, and the signal reconstruction unit 130 generate a reconstructed synchronous signal according to the synchronous signal whose phase has a longest lag for synchronization of pixel data, but the present disclosure is not limited thereto.

Figure 2:
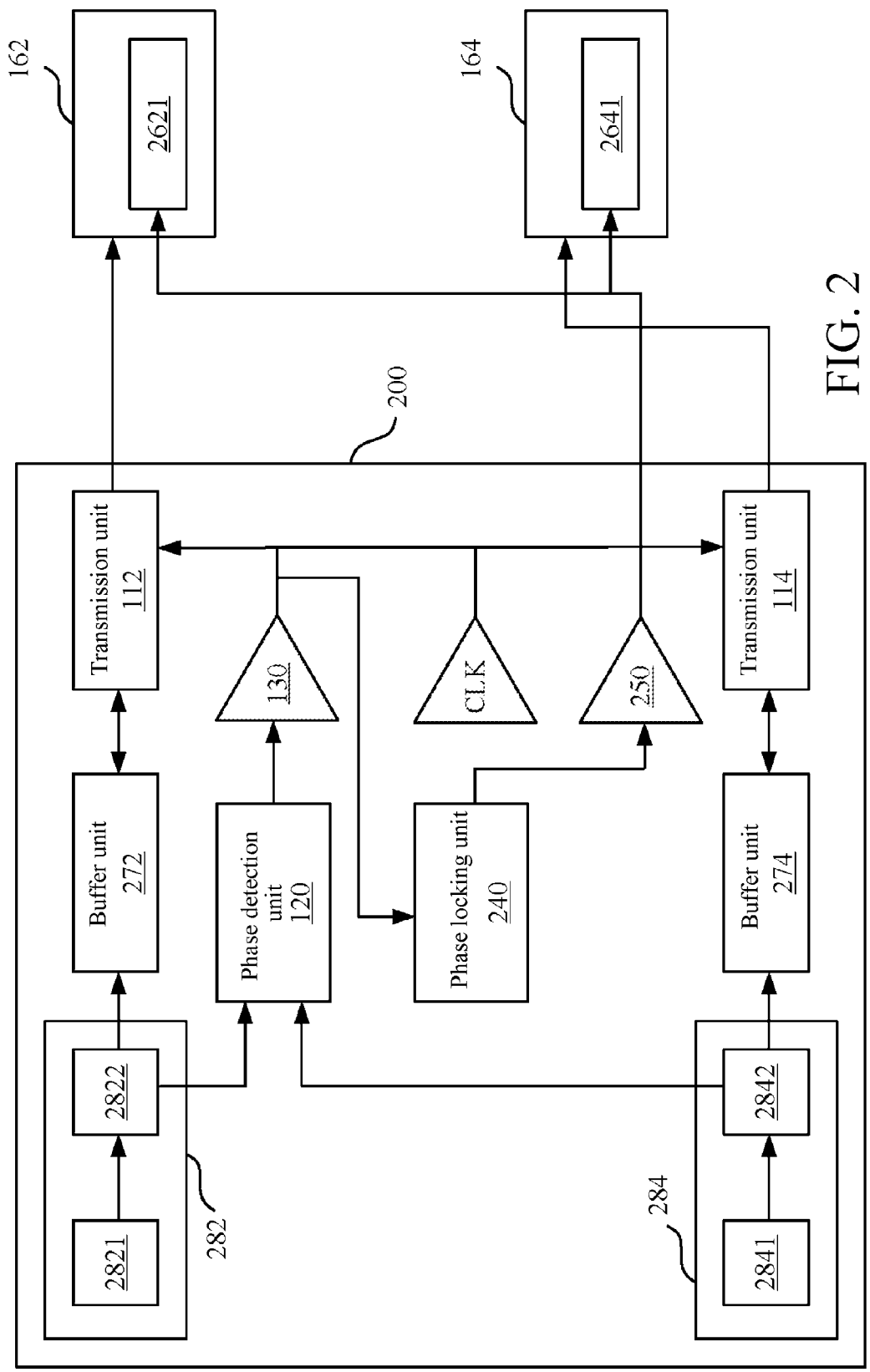
FIG. 2 is a schematic diagram of a driving device according to an embodiment of the present disclosure.

Referring to FIG. 2, FIG. 2 is a schematic diagram of a driving device 200 according to an embodiment of the present disclosure. The architecture of the driving device 200 is basically the same as that of the driving device 100, except for a phase locking unit 240, a signal generation unit 250, a clock generation unit CLK, a plurality of receiving units 282, 284, and a plurality of buffer units 272, 274. The buffer units 272, 274 are coupled to the receiving units 282, 284 and the transmission units 112, 114.

The receiving units 282, 284 are configured to receive the data packets, and decode the data packets to generate the synchronous signals and the pixel data. Specifically, the receiving units 282, 284 may include receivers 2821, 2841 and decoders 2822, 2842. The receivers 2821, 2841 are configured to receive different data packets, and the decoders 2822, 2842 decode the received data packets (for example, data packets that are transmitted to the display device in the left-eye position and the display device in the right-eye position) respectively to generate the synchronous signals and the pixel data. As discussed above, an asynchronous phenomenon may occur in the synchronous signals generated by decoding the different data packets by the decoders 2822, 2842. The buffer units 272, 274 (for example, a frame buffer is configured to buffer the pixel data generated by the receiving units 282, 284. In another aspect, as discussed above, the synchronous signals are transmitted by the receiving units 282, 284 to the phase detection unit 120 to detect a phase difference between the synchronous signals.

The clock generation unit CLK is configured to generate a clock signal and transmit the clock signal to the transmission units 112, 114. The transmission units 112, 114 are further configured to synchronously transmit the foregoing synchronized pixel data to the display devices 162, 164 according to the clock signal for display. Specifically, according to a same clock signal, the transmission units 112, 114 are further configured to control the buffer units 272, 274 to transmit the buffered pixel data to the transmission units 112, 114 for synchronization of the pixel data. Therefore, the transmission units 112, 114 may synchronously transmit the synchronized pixel data to the display devices 162, 164 according to the clock signal for display.

In addition to synchronization of pixel data, in the present disclosure, backlight units 2621, 2641 of the display devices 162, 164 may be further controlled. In an embodiment, a display device 200 further includes a phase locking unit 240 and a signal generation unit 250. The signal generation unit 250 is coupled to the phase locking unit 240. The phase locking unit 240 (for example, a phase lock) is configured to receive the reconstructed synchronous signal, and generate a backlight synchronous signal according to the reconstructed synchronous signal for synchronous control of the backlight units 2621, 2641 of the display devices 162, 164. It should be noted that, there is a fixed phase difference between the backlight synchronous signal and the reconstructed synchronous signal (for example, the backlight synchronous signal lags behind the reconstructed synchronous signal by the fixed phase difference). The signal generation unit 250 is configured to generate a plurality of backlight control signals according to the backlight synchronous signal for synchronous control of the backlight units 2621, 2641. Specifically, in a process in which liquid crystal rotates, a user may experience discomfort when viewing the display devices 162, 164. In this embodiment, the display device 200 controls, by using the backlight synchronous signal separated from the reconstructed synchronous signal by the fixed phase difference, the backlight units 2621, 2641 of the display devices 162, 164 to be turned on (that is, lighted) at the same time only after the rotation of liquid crystal ends, and at the rest time (that is, during rotation of liquid crystal), the backlight units 2621, 2641 are both turned off. In other words, the user does not see a process of rotation of liquid crystal, and therefore, discomfort of viewing the display devices is also reduced accordingly. It should be added that the driving device 200 may further adjust display brightness (for example, increase brightness of the backlight units 2621, 2641 when being lighted) of the backlight units 2621, 2641 to compensate for a decrease in display brightness because the backlight units 2621, 2641 are turned off.

In such a manner, the driving device 200 according to the present disclosure may control a time at which the backlight units 2621, 2641 of the display devices 262, 264 are turned on, thereby further reducing discomfort experienced by the user when the user views the process of rotation of liquid crystal.

Alternatively, in another embodiment, the display devices 262, 264 may be organic light-emitting diode displays. The signal generation unit 250 may be configured to generate a plurality of shading control signals according to a backlight synchronous signal to synchronously control the display devices 262, 264 to display the foregoing synchronized pixel data within only a display time, and control the display devices 262, 264 to be shaded at a time beyond the display time.

It should be added that to reduce asynchronous signals caused by inconsistent path, to minimize paths from the transmission units 112, 114 to the display devices 162, 164 is one of the considerations for the driving devices 100, 200.

In practice, the receiving units 282, 284 may include high-speed interface receivers, and the transmission units 112, 114 may include high-speed interface transmitters. A high-speed interface is, for example, a mobile industry processor interface (MIPI), and an embedded display port (eDP), but the present disclosure is not limited thereto.

In conclusion, the driving devices 100, 200 according to the present disclosure may effectively synchronize pixel data for synchronous display of the display devices 262, 264 to eliminate a skew phenomenon between different data packets. In addition, the driving devices 100, 200 may further control a time at which the backlight units 2621, 2641 are turn on, to further reduce viewing discomfort of a user.

Although the present application has been disclosed above by using the implementation manners, the implementation manners are not used to limit the present application. Any person skilled in the art may make various variations and modifications without departing from the spirit and scope of the present application, and therefore the protection scope of the present application should be as defined by the appended claims.

What is claimed is:

1. A driving device, comprising:
    a phase detection unit, for receiving a plurality of initial synchronous signals corresponding to a plurality of data packets, and detecting a phase difference between the initial synchronous signals to generate a detection result signal;
    a signal reconstruction unit, coupled to the phase detection unit, for generating a reconstructed synchronous signal according to the detection result signal;
    a plurality of transmission units, for receiving the reconstructed synchronous signal, and for synchronizing a plurality of pixel data corresponding to the data packets according to the reconstructed synchronous signal for transmission to a plurality of display devices; and
    a phase locking unit, for receiving the reconstructed synchronous signal, and for generating a backlight synchronous signal according to the reconstructed synchronous signal for synchronous control of a plurality of backlight units of the display devices, wherein there is a fixed phase difference between the backlight synchronous signal and the reconstructed synchronous signal.

2. The driving device according to claim 1, further comprising:
    a signal generation unit, coupled to the phase locking unit, for generating a plurality of backlight control signals according to the backlight synchronous signal for synchronous control of the backlight units.

3. The driving device according to claim 1, further comprising:
    a clock generation unit, for generating a clock signal and for transmitting the clock signal to the transmission units, wherein the transmission units are further configured to synchronously transmit the plurality of pixel data after having been synchronized to the display devices according to the clock signal.

4. The driving device according to claim 1, further comprising:
    a plurality of receiving units, for receiving the data packets and for decoding the data packets to generate the initial synchronous signals and the pixel data.

5. The driving device according to claim 4, further comprising:
    a plurality of buffer units, coupled to the receiving units and the transmission units, for buffering the pixel data generated by the receiving units, wherein the transmission units are further configured to control the buffer units to transmit the pixel data to the transmission units to synchronize the pixel data.

6. The driving device according to claim 4, wherein the receiving units comprise a plurality of high-speed interface receivers, and the transmission units comprise a plurality of high-speed interface transmitters.

7. The driving device according to claim 1, wherein the phase detection unit generates the detection result signal by selecting one of the initial synchronous signals whose phase has a longest lag.

8. A driving method, comprising:
    generating, by a synchronous signal generator, a reconstructed synchronous signal according to a phase difference between a plurality of initial synchronous signals, wherein the initial synchronous signals are obtained by decoding a plurality of data packets;
    synchronizing, by a plurality of transmission units, a plurality of pixel data according to the reconstructed synchronous signal for transmission to a plurality of display devices, wherein the pixel data are obtained by decoding the data packet; and
    generating, by a phase lock, a backlight synchronous signal according to the reconstructed synchronous signal for synchronous control of a plurality of backlight units of the display devices, wherein there is a fixed phase difference between the backlight synchronous signal and the reconstructed synchronous signal.

9. The driving method according to claim 8, further comprising:
    generating, by a backlight signal generator, a plurality of backlight control signals according to the backlight synchronous signal for synchronous control of the backlight units.

10. The driving method according to claim 8, further comprising:
    transmitting, by the transmission units, the plurality of pixel data after having been synchronized to the display devices by a clock signal.

11. The driving method according to claim 8, further comprising:
    controlling a plurality of buffer units by respective transmission units to transmit the pixel data to the transmission units to synchronize the pixel data, wherein the pixel data are buffered inside the buffer units.

12. The driving method according to claim 8, further comprising:
    detecting, by a phase detector, the phase difference between the initial synchronous signals to generate a detection result signal; and
    generating, by the synchronous signal generator, the reconstructed synchronous signal according to the detection result signal.

13. The driving method according to claim 12, further comprising:
    selecting, by the phase detector, an initial synchronous signal whose phase has a longest lag as the detection result signal.

* * * * *